US008837050B2

(12) United States Patent
Hudman

(10) Patent No.: US 8,837,050 B2
(45) Date of Patent: Sep. 16, 2014

(54) OPTICAL WEDGE REDIRECTION APPARATUS AND OPTICAL DEVICES USING SAME

(75) Inventor: Joshua M. Hudman, Issaquah, WA (US)

(73) Assignee: Microvision, Inc., Redmond, WA (US)

( * ) Notice: Subject to any disclaimer, the term of this patent is extended or adjusted under 35 U.S.C. 154(b) by 338 days.

(21) Appl. No.: 13/079,974

(22) Filed: Apr. 5, 2011

(65) Prior Publication Data

US 2012/0257282 A1 Oct. 11, 2012

(51) Int. Cl.
*G02B 27/10* (2006.01)
*G02B 27/01* (2006.01)
*G02B 5/04* (2006.01)
*G02B 27/00* (2006.01)
*G02B 3/00* (2006.01)

(52) U.S. Cl.
CPC ........ *G02B 27/0025* (2013.01); *G02B 27/0172* (2013.01); *G02B 3/0006* (2013.01); *G02B 5/04* (2013.01); *G02B 2027/015* (2013.01); *G02B 2027/011* (2013.01); *G02B 27/0081* (2013.01)
USPC ....................................................... 359/619

(58) Field of Classification Search
USPC ............................................... 359/619–630
See application file for complete search history.

(56) References Cited

U.S. PATENT DOCUMENTS

| 5,675,368 | A | * | 10/1997 | Turner | 347/164 |
| 5,801,374 | A | * | 9/1998 | Campbell et al. | 250/208.2 |
| 2009/0231719 | A1 | * | 9/2009 | Powell | 359/630 |
| 2010/0079861 | A1 | * | 4/2010 | Powell | 359/449 |

* cited by examiner

*Primary Examiner* — William Choi
*Assistant Examiner* — Sharrief Broome
(74) *Attorney, Agent, or Firm* — Kevin D. Wills

(57) ABSTRACT

An exit pupil expander (904), operable as a numerical aperture expander and suitable for use with high angle of incidence scanned laser projection systems, includes a microlens array (910) and a varied thickness optical element (900). The varied thickness optical element can be configured to transform a principal beam (953) of a received scan cone (952) to be substantially orthogonal with an output of the exit pupil expander (904) or major surface of the microlens array (910). Further, the varied thickness optical element (900) can be configured to cause the received scan cone (952) to exit the varied thickness optical element (900) substantially symmetrically about the principal beam (953). The varied thickness optical element (900) can also be configured to introduce a controlled amount of spread to the received scan cone (952). The varied thickness optical element (900) is useful in correcting distortion, such as keystone distortion introduced by high angle of incidence feed.

20 Claims, 11 Drawing Sheets

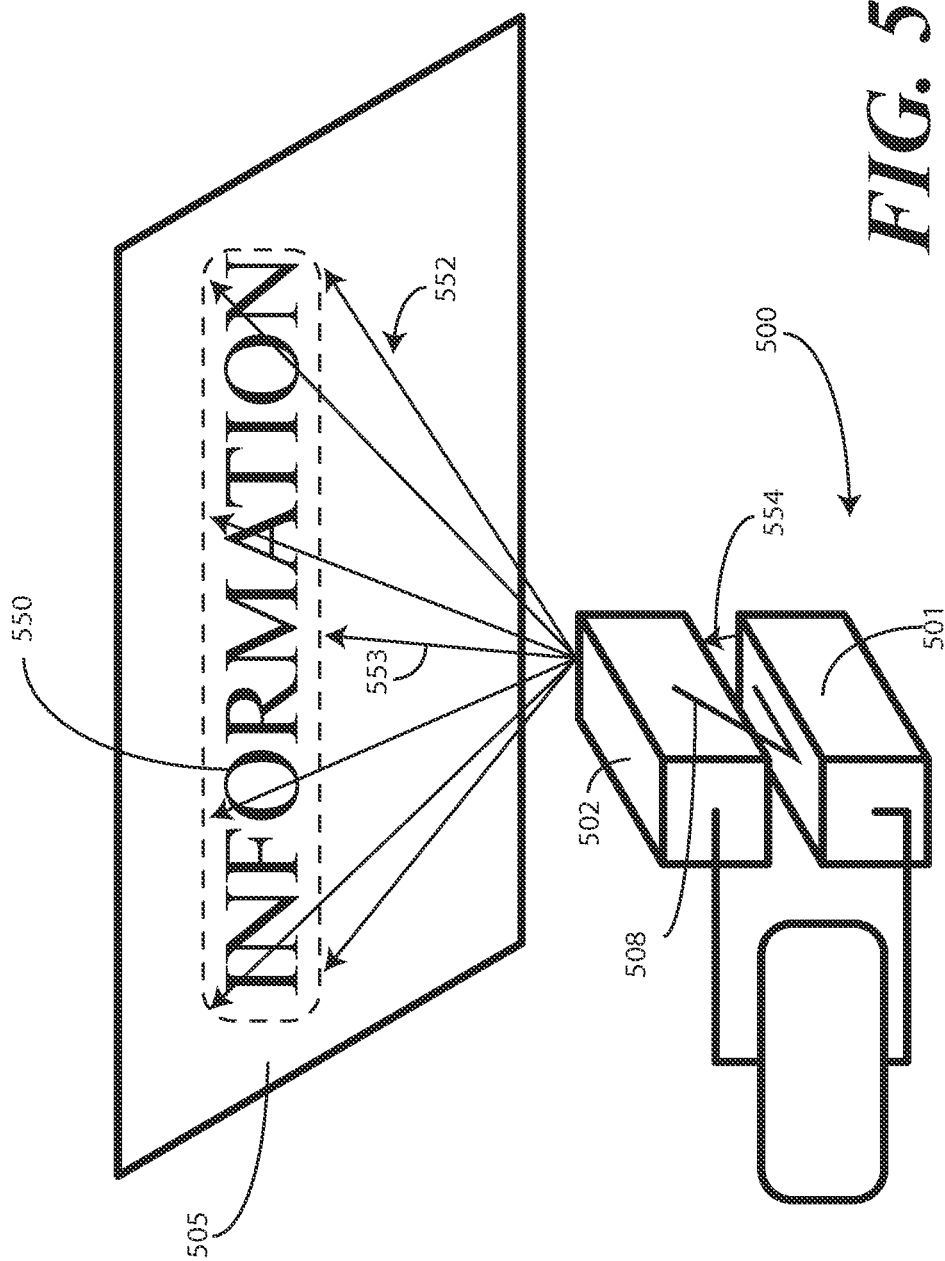

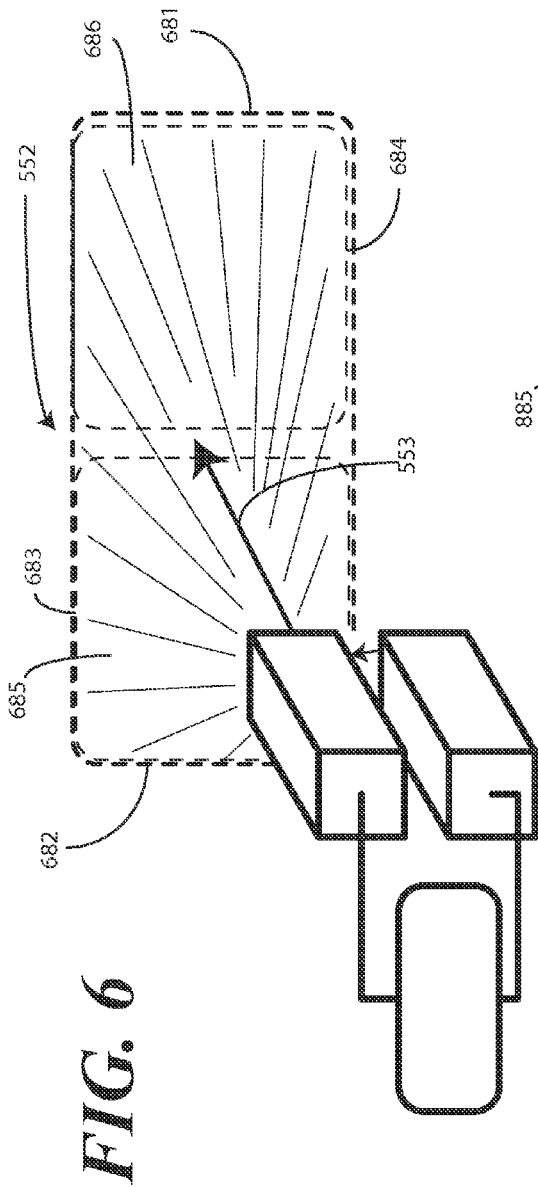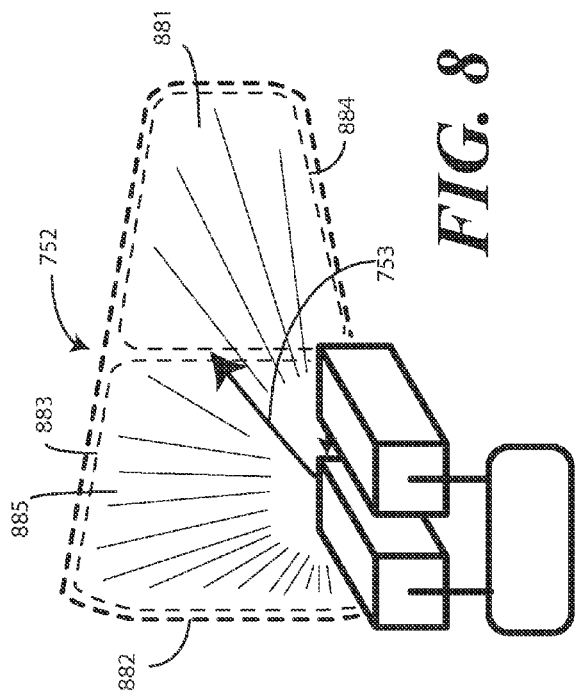

US 8,837,050 B2

OPTICAL WEDGE REDIRECTION APPARATUS AND OPTICAL DEVICES USING SAME

BACKGROUND

1. Technical Field

This invention relates generally to optical devices, and more particularly to optical redirection devices.

2. Background Art

Scanned laser projection devices facilitate the production of brilliant images created with vibrant colors. Scanned systems, such as those manufactured by Microvision, Inc., are capable of creating bright, sharp images with a large depth of focus. Additionally, these scanned laser projection systems can be designed with compact form factors at a reasonable cost. These systems consume small amounts of power yet deliver vivid, complex images.

Scanned laser projection devices are frequently used in sophisticated projection systems such as head-up displays and near-to-eye displays. In such applications, lasers present information to a user, either by presenting the information on a projection surface or by delivering the information directly to the user's eye.

One challenge associated with these systems is size reduction. It can be desirable to make the systems smaller, so that the projection systems can be used in compact applications, such as with eyeglasses or goggles. However, as the optical components become smaller, issues can arise. Distortion of images can be introduced. Similarly, optical artifacts can become a problem.

It would be advantageous to have a compact projection system that does not introduce distortion into projected images.

BRIEF DESCRIPTION OF THE DRAWINGS

FIG. 5 illustrates a scanning engine having a low angle of incidence between light source and scanning engine.

FIG. 6 illustrates a projection cone associated with a low angle of incidence scanned projection system.

FIG. 8 illustrates a projection cone associated with a high angle of incidence scanned projection system.

Figure 1:
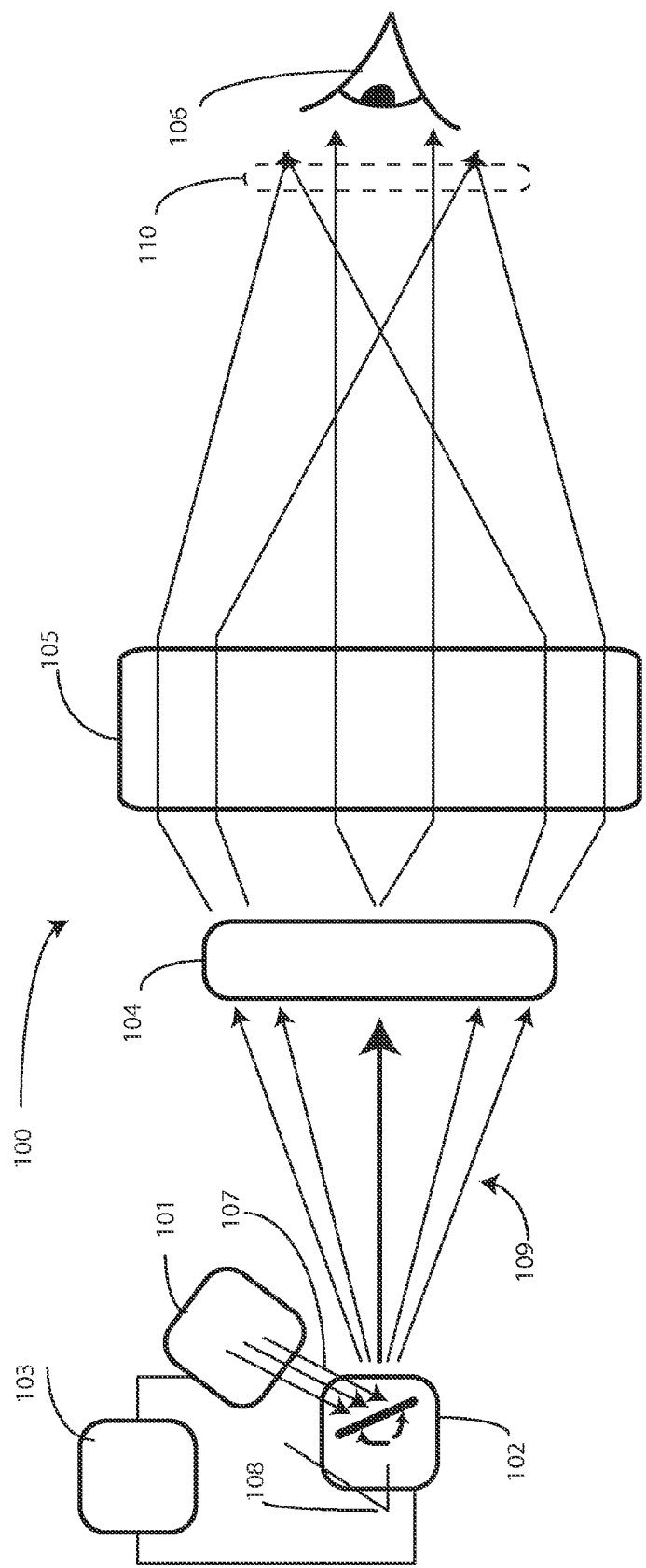
FIG. 1 illustrates a general block-diagram of a projection system used with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to an optical redirection device and an associated projection surface, imaging system, and applications thereof. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the systems and applications set forth below. The non-processor circuits may include, but are not limited to, microprocessors, scanning mirrors, image spatial modulation devices, memory devices, clock circuits, power circuits, and so forth. As such, the functions and operative states shown herein may be interpreted as steps of a method. Alternatively, some or all functions employed by the one or more processors to control the various elements herein, including the spatial light modulator, beam translator, and light translation element, could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

FIG. 1 illustrates a block diagram generally setting forth the elements of a head-up or near-to-eye projection system 100. While embodiments of the invention described herein are suitable for use in any number of different applications, for ease of discussion a near-to-eye projection system will be described to illustrate the operation of the various elements. While the elements may change in size or form, their operation will generally be the same in head-up display systems. Those of ordinary skill in the art having the benefit of this disclosure will readily recognize the scanning engines, beam redirecting devices, and microlens arrays described below may be used in any number of other applications as well. Accordingly, the scope of the claims is not intended to be limited by the illustrative application used for description purposes.

The system 100 includes a laser projection source 101, a scanner 102, a control circuit 103, an exit pupil expander 104, and relay optics 105. The system 100 uses these elements to present information to a user 106. In a near-to-eye application, the information will be delivered directly to the user's eye. In a head-up display, a transparent projection surface may be employed upon which information can be presented.

While the laser projection source 101 can be a simple monocolor laser, it can alternatively comprise multiple lasers or an integrated multicolor laser device. In one embodiment, the laser projection source 101 includes a red laser, a blue laser, and a green laser. These lasers can be of various types. For example, for compact designs, semiconductor-based lasers can be used, including edge emitting lasers or vertical cavity surface emitting lasers. In other applications, larger, more powerful lasers can be used, alone or in combination. Where multiple lasers are used as the laser projection source 101, one or more optical alignment devices (not shown in FIG. 1) may be used to orient the plurality of light beams into a single combined light beam. The alignment devices can further blend the output of each laser to form a coherent, multicolored beam of light. In one embodiment, dichroic mirrors can be used to orient the light beams into the combined light beam. Dichroic mirrors are partially reflective mirrors that include dichroic filters that selectively pass light in a narrow bandwidth while reflecting others.

The control circuit 103, which may be a microprocessor or other programmable device, executes embedded instructions to control the scanner 102, and optionally the laser projection source 101 as well. For example, in one embodiment the control circuit 103 is programmed to control the scanning of the light 108 received from the laser projection source 101 to form a desired image on the exit pupil expander 104 for delivery to the user 106.

The laser projection source 101 delivers light 107 to the scanner 102 at an angle of incidence 108 determined by the physical geometry of the scanner 102 relative to the light projection source 101 (and any intermediate optical elements). In one embodiment, the scanner 102 is configured as a two-axis raster laser scanner capable of scanning the light across in a raster sweep pattern and delivers scanned light in the form of a scan cone 109 to the exit pupil expander 104.

The exit pupil expander 104 serves as a "numerical aperture" expander that provides the user 106 with an expanded eye box 110 within which information may be seen. The expanded eye box 110 allows the user 106 to have a comfortable range of head or eye positions over which they are able to receive light from the system 100. The eye focuses the light received from the system 100 and the user 106 sees a "virtual" image.

In one embodiment, the exit pupil expander 104 is disposed at an intermediate image plane of the system 100. In one embodiment, the exit pupil expander 104 comprises an ordered array of microstructures or a randomized light diffuser. For example, as will be described in more detail below, in one embodiment the exit pupil expander 104 can be configured as a micro lens array. The exit pupil expander 104 can be manufactured from a molded liquid polymer, or may be formed via other methods. The exit pupil expander 104 may comprise single or complementary glass or plastic beads, or microspheres or nanospheres, or similarly shaped objects capable of functioning as an optical diffuser or lens. The exit pupil expander 104 may have optical properties resulting from a selected pitch, radius, or spacing of its constituent parts to expand incident light.

The relay optics 105 then transfer light received from the exit pupil expander 104 to the user 106. The relay optics 105, which can comprise one or more devices, are optical transfer devices that direct light from a relay input to a relay output. For example, the relay optics 105 can include a light-guiding substrate that defines the optical transfer properties of the overall relay. Regardless of application, in general the relay optics 105 uses a combination of elements with optical power, which may be lenses of curved reflectors, and a transfer medium, which may be free-space or may be a high-index medium surrounded by a low index medium, to transfer the image from the exit pupil expander 104 intermediate image plane to the viewing space where the observer is able to see the virtual or real image with their eyes.

In many cases, one element of the relay optics 105 is a combiner, which both reflects light from the display towards the users eyes and transmits light from the world around so that the users sees his normal view of the world overlaid with information from the display. In the case of a head-up display, the combiner element may be the car windshield or some other partial reflector. In the case of near-to-eye systems, the combiner may be a series of partially reflective surfaces, an example of which is described in FIG. 4 below.

Figure 2:
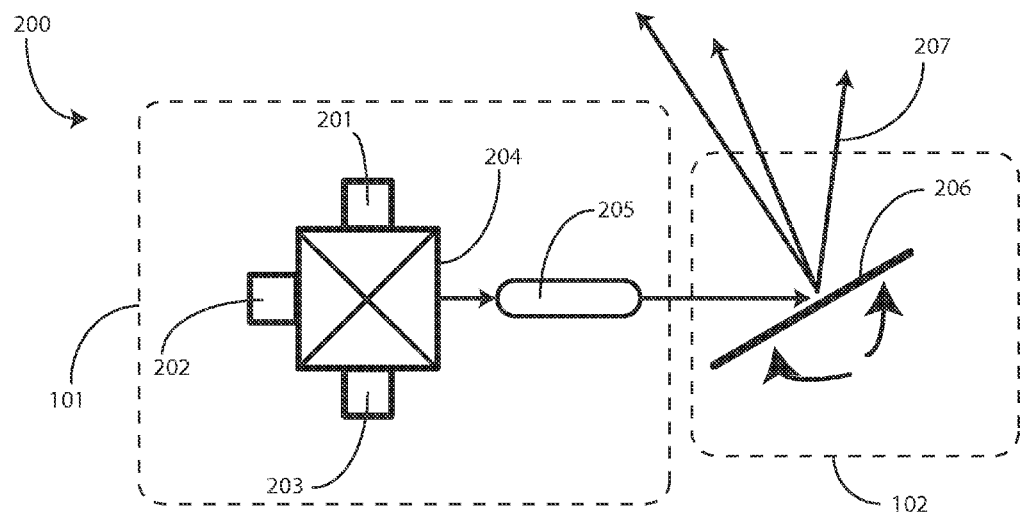
FIG. 2 illustrates one embodiment of a scanning engine configured in accordance with embodiments of the invention.

FIG. 2 illustrates a more detailed view of the scanning engine 200, which includes the laser projection source 101 and the scanner 102. The illustrative scanning engine 200 of FIG. 2 is a Microelectromechanical System (MEMS) scanning engine. Examples of MEMS scanning light sources, such as those suitable for use with embodiments of the present invention, are set forth in commonly assigned US Pub. Pat. Appln. No. 2007/0159673, entitled, "Substrate-guided Display with Improved Image Quality," which is incorporated by reference herein.

Figure 4:
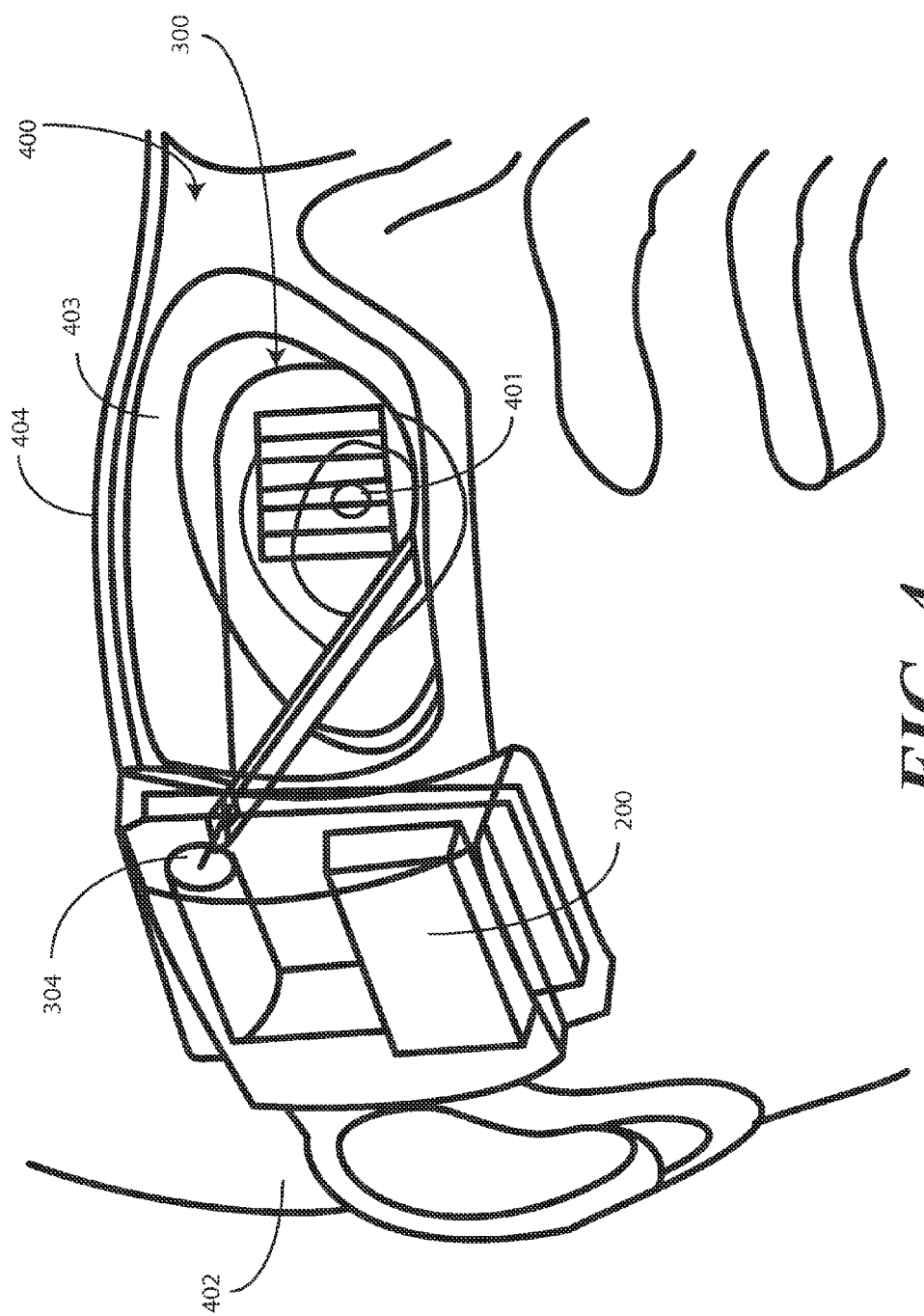
FIG. 4 illustrates one near-to-eye application configured in accordance with embodiments of the invention.

In FIG. 4, the MEMS scanning engine 200 employs three light sources 201,202,203. A beam combiner 204, which may employ the dichroic mirrors described above, combines the output of light sources 201,202,203 to produce a combined modulated beam. A variable collimation or variable focusing optical element 205 produces a variably shaped beam that is scanned by the MEMS scanning mirror 206 as a scanned light cone 207. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, referenced above. The scanned light beam 807 can then be directed to the buried numerical aperture expander (105).

Figure 3:
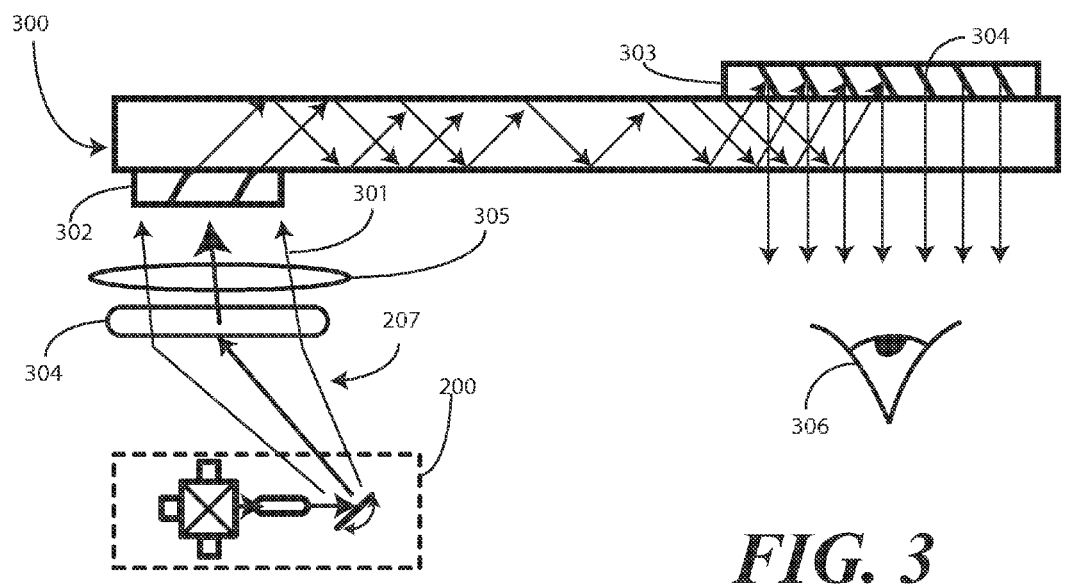
FIG. 3 illustrates an illustrative near-to-eye application for use with embodiments of the invention.

FIG. 3 illustrates the scanning engine 200 of FIG. 2 delivering light to a relay 300 and corresponding optics in a near-to-eye application. Specifically, the MEMS scanning engine 200 launches the scan cone 207 into the relay optics, which include an exit pupil expander 304, a lens 305, and an input coupler 302. The scan cone 207 first arrives at the exit pupil expander 304. The exit pupil expander 304 delivers an expanded scan cone 301 through a lens 305 to an input coupler 302 of the optical relay 300, which in this illustrative embodiment is a substrate-guided relay. Light then propagates through the optical relay 300 in accordance with the optical properties of the substrate to an output coupler 303. In this embodiment, the light then is redirected from one or more partially reflective layers 304 to the user's eye 306.

FIG. 4 illustrates the system of FIG. 3 in operation. An eyewear device 400 using an optical relay 300 presents information directly into than eye 401 of a user 402. The optical relay 300 receives light from an exit pupil expander 304. A MEMS scanning engine 200 delivers light to the exit pupil expander 304. The eyewear device 400 includes lens assemblies 403 that are coupled to a frame 404. In this illustrative embodiment, the optical relay 300 is integrated into the lens assembly 403. In one embodiment, the eyewear device 400 and optical relay 300 are configured such that the user 402 can see images beyond the lens assemblies 403 at the same time the MEMS scanning engine 200 is delivering information.

Referring briefly back to FIG. 1, in such projection systems, so long as the angle of incidence 107 defined between the laser projection source 101 and the scanner 102 is small, the system works well and delivers nearly distortion free images to the user 106. Experimental testing has shown that, in some cases, the overall size of the scanning engine can be reduced if the angle of incidence 107 is increased. However, testing has shown that when the angle of incidence increases beyond a design threshold, which can be about fourteen or fifteen degrees, noticeable distortion is introduced due to asymmetry in the scan cone 109. The asymmetry results from the large angle of incidence 107.

For example, FIG. 5 illustrates a scanning engine 500 where the angle of incidence 508 is below the design threshold. The laser projection source 501 delivers light 554 to the scanner 502. The light 554 comprises a feed beam that is delivered to the reflective surface of the scanner. The scanning action of the reflective surface redirects the light 554 in a sweep pattern to present an image 550 on the exit pupil expander 505. The sweeping action of the reflective surface creates the scan cone 552. A substantially center beam of the scan cone 552 is referred to as the "principal beam" 553. The principal beam 553 generally defines a pointing direction of the scan cone 552, and represents the direction of a feed beam reflected from the scanner 502 when the scan mirror is at its central rest position. The principal beam 553 also indicates the direction that the scan cone 552 propagates.

The light 554 is delivered to the scanner 502 at an angle of incidence 508 that is less than the design threshold. In this illustrative embodiment, the design threshold is about fourteen or fifteen degrees. Accordingly, the angle of incidence 508 may be nine or ten or eleven degrees. Since the angle of incidence 508 is below the design threshold, the scan cone 552 is substantially symmetrical about the principal beam 553. Accordingly, the image 550 appears normal and is substantially free from distortion.

FIG. 6 illustrates the scan cone 552 of FIG. 5 in more detail. As shown in FIG. 6, the scan cone 552 is substantially proportional in area about the principal beam 553. The scan cone 552 is said to be substantially proportional in area because a first side 681 of the scan cone 552 is substantially the same shape and/or length as a second side 682 of the scan cone 552. Similarly, a top side 683 of the scan cone 552 is substantially the same shape and/or length as the bottom side 684 of the scan cone 552.

The scan cone 552 is also substantially symmetrical about the principal beam 553. The principal beam 553 is substantially disposed in the center of the scan cone 552, with a first half 685 of the scan cone 552 disposed to the left of the principal beam 553 appearing to be similar in area with a second half 686 of the scan cone 552 disposed to the right of the principal beam 553. (Note that the halves are shown to the left and right, but could also be shown as being defined above and below the principal beam 553.)

Substantially symmetrical scan cones facilitate clear presentation of information without significant distortion. Turning briefly back to FIG. 5, the substantially symmetrical scan cone 552, makes the information 550 projected on the exit pupil expander 505 clear and legible.

Figure 7:
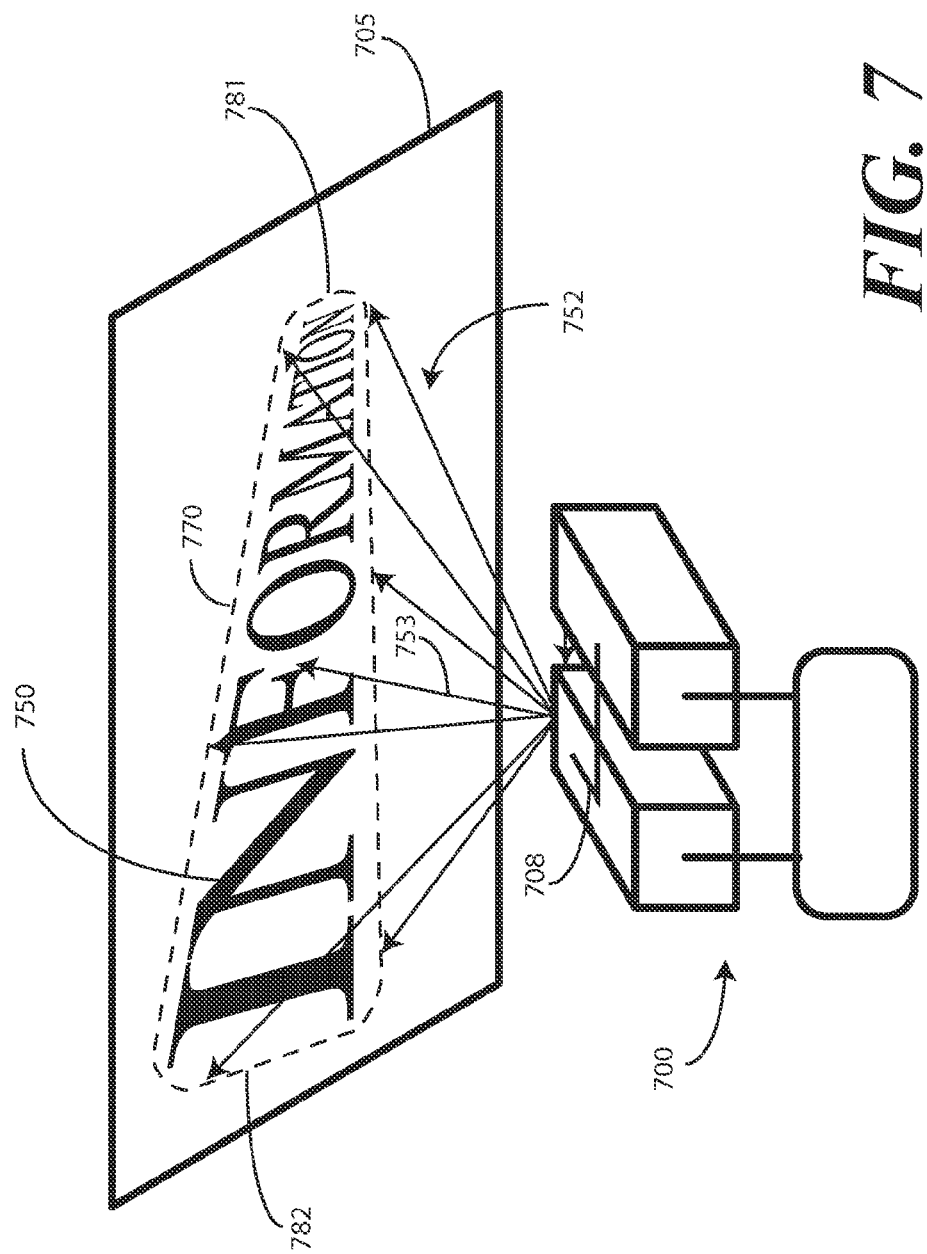
FIG. 7 illustrates a scanned laser projection system configured with a high light-to-scanner angle of incidence in accordance with one or more embodiments of the invention.

By contrast, FIG. 7 illustrates a scanning engine 700 where the angle of incidence 708 is above the design threshold. In this illustrative embodiment, the angle of incidence 708 is about twenty-seven or twenty-eight degrees, far more than the threshold of fourteen to fifteen degrees mentioned above. This large angle of incidence 708 introduces asymmetry in the scan cone 752, which results in the image 750 on the exit pupil expander 705 having a combination of pincushion, coma, and keystone distortion. This combined distortion manifests as the image 750 appearing to have a first side 781 that is "pinched" relative to the other side 782 due to the scan cone 752 being "tilted" about the principal beam 753. Since the keystone distortion dominates, the result is an apparent image shape 770 resembling a keystone of an arch While the principal beam 753 still defines the general pointing direction, the scan cone 752 disposed about the principal beam 753 is neither substantially symmetrical nor substantially proportional because planar surfaces are effectively being projected on a "tilted" plane due to high angle of incidence scanner feed. This creates a "tilted scan object plane" relative to the principal beam 753, which appears as keystone distortion.

FIG. 8 illustrates the scan cone 752 of FIG. 7 in more detail. The scan cone 752 is said to be substantially non-proportional because a first side 881 of the scan cone 752 appears substantially different in shape and/or length relative to a second side 882 of the scan cone 752 due to the tilted scan object plane relative to the principal beam 753. Similarly, a top side 883 of the scan cone 752 substantially appears different in alignment and direction relative to the bottom side 884 of the scan cone 752.

The scan cone 752 also appears as being substantially asymmetrical. The principal beam 753 is shown in the center of the scan cone 752, with a first half 885 of the scan cone 752 disposed to the left of the principal beam 753, and a second half 886 of the scan cone 752 shown to the right of the principal beam 753. In this illustrative embodiment, the first half 885 and the second half 886 appear to have substantially different areas as viewed on the exit pupil expander 705.

Substantially asymmetrical scan cones hinder clear presentation of information without significant distortion. Turning back to FIG. 7, the high angle of incidence 708 causes a substantially asymmetrical scan cone 752, makes the image 750 projected on the exit pupil expander 705 appear distorted. While keystone error can sometimes be corrected in the projection system, it is not always desirable due to tight tolerance requirements and other distortion issues that can arise.

One may also note that the scanning engine 700 of FIG. 7 is oriented horizontally, while the scanning engine (500) of FIG. 5 was oriented vertically. The scanning engine 700 is shown as a horizontally fed system because experimental testing has shown that configuring MEMS scanners horizontally relative to the laser projection source allows the scanning engine to be manufactured in a more compact form factor. More compact form factors lend themselves better in many applications, including the near-to-eye application shown in FIG. 4 above. However, horizontal alignment frequently requires an angle of incidence that is greater than the design threshold. Consequently, horizontally aligned systems frequently suffer from keystone distortion. It should be noted, however, that vertically aligned systems can also suffer from keystone distortion if the angle of incidence is beyond the design threshold.

Embodiments of the present invention provide a solution to the keystone distortion introduced in high angle of incidence systems, regardless of alignment. Embodiments of the invention are particularly useful in applications where an exit pupil expander and relay optics are employed. Such applications include the virtual image head-up displays and near-to-eye displays described above because both employ exit pupil expanders to create a large exit pupil or "eye boxes" at the user's eye.

While one can somewhat correct keystone distortion by tilting the scanning engine relative to the exit pupil expander (or other projection surface), this option is less than desirable. Tilting causes the principal beam to no longer be in the center of a displayed image. Additionally, the direction of propagation of the scan cone is no longer orthogonal to the exit pupil expander. This greatly complicates the relay optics. Said differently, the design of relay optics can be greatly simplified when the direction of propagation is normal to the exit pupil expander. Embodiments described below accomplish this task: redirection of a scan cone from a high angle of incidence scanning engine such that the scan cone is symmetrical about the principal beam and travels in a direction substantially normal to the exit pupil expander.

Figure 9:
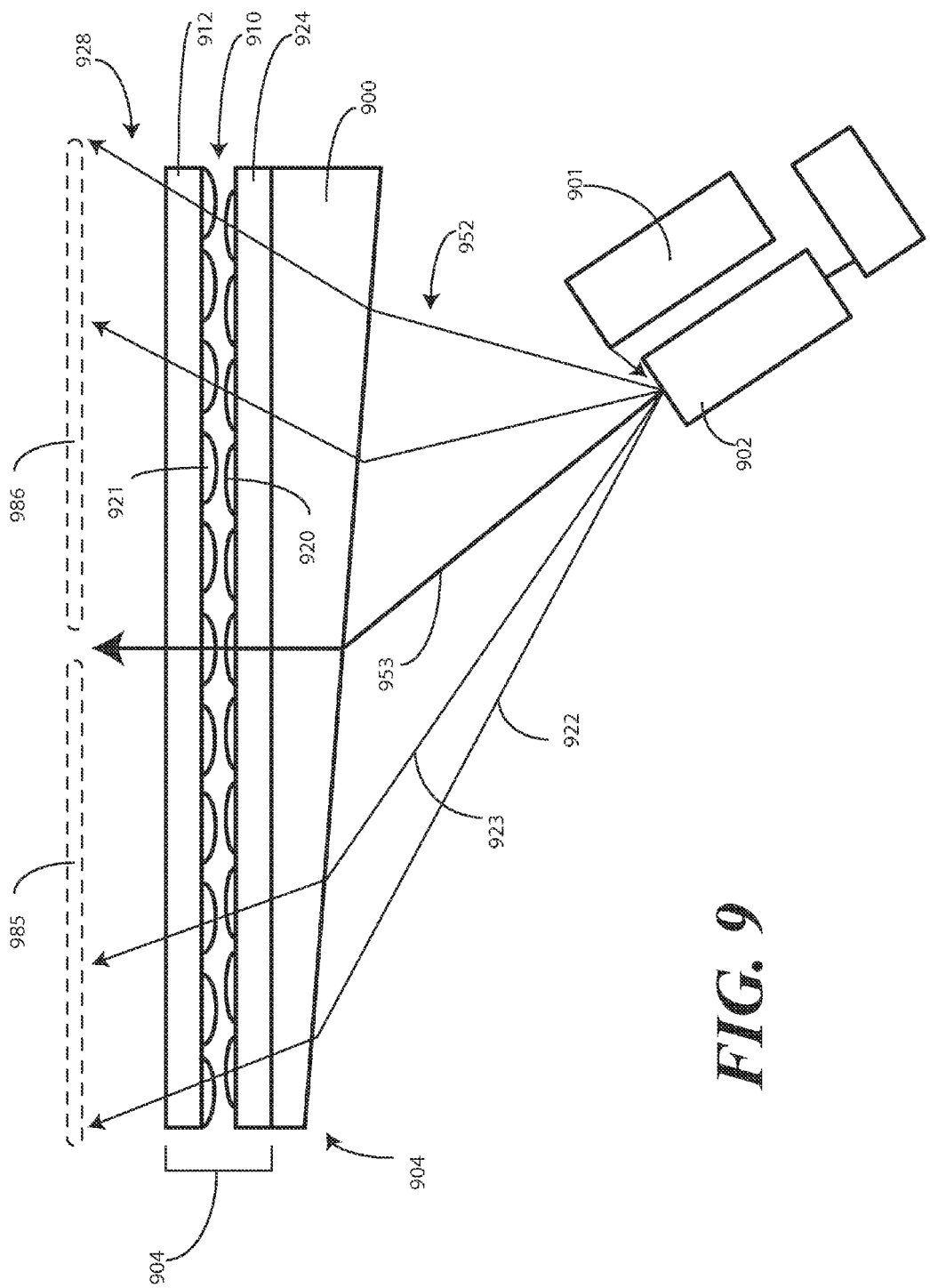
FIG. 9 illustrates an optical redirection device and corresponding microlens array, operable as an exit pupil expander, configured in accordance with embodiments of the invention.

Turning now to FIG. 9, illustrated therein is an alternate exit pupil expander 904 suitable for use with high angle of incidence laser projection sources in accordance with one or more embodiments of the invention. "High angle of incidence" refers to systems where the angle of incidence between scanner 902 and light projection source 901 is greater than the design threshold.

The exit pupil expander 904 of FIG. 9 corrects for keystone distortion in high angle of incidence scanned laser systems without the problems associated with correction techniques applied at the projector level. For example, systems employing the exit pupil expander 904 can be manufactured less expensively than systems correcting keystone distortion at the projector level. Additionally, the tolerances associated with the manufacture of the exit pupil expander 904 are not as tight as those associated with projector level correction systems.

Anytime keystone error is corrected, astigmatism distortion can be introduced. In prior art systems, where keystone is corrected in the projection system, the astigmatism distortion causes the beam spot resolution to grow beyond desirable limits. The exit pupil expander 904 of FIG. 9 prevents this problem because any astigmatism that is generated does not have an opportunity to cause beam growth at the exit pupil expander 904. Some growth may occur beyond the exit pupil expander 904, but this is generally inconsequential in a head-up or near-to-eye application. Said differently, while the exit pupil expander 904 of FIG. 9 may introduce some minor astigmatism distortion, it does so at the intermediate image plane of the system rather than at the point of projection. Accordingly, any distortion is occurring at the plane of focus, thereby significantly reducing its impact. Accordingly, focused spots on the exit pupil expander 904 appear tighter than when using a conventional projection surface and a projection level correction technique.

The illustrative exit pupil expander 904 of FIG. 9 includes a numerical aperture expander 905 suitable for use with relay optics in a head-up or near-to-eye application. The numerical aperture expander 905 includes a first layer 912 and a second layer 924, with a microlens array 910 disposed therebetween. The microlens array 910 of FIG. 9 is a complementary microlens array, as it includes microlens pairs that work in tandem. For example, microlens 920 and microlens 921 work together, with light exiting microlens 920 and entering microlens 921 while passing through the exit pupil expander 904.

A varied thickness optical element 900 is disposed adjacent to microlens array 910. In the illustrative embodiment of FIG. 9, the varied thickness optical element 900 is configured as a wedge and is attached to the second layer 924 of the exit pupil expander 904. The varied thickness optical element 900 is configured to transform a principal beam 953 of a scan cone 952 received from the scanner 902 to be substantially orthogonal with the output of the exit pupil expander 904. The term "substantially" is used to refer to an angle that is generally orthogonal, but may not be exactly orthogonal due to manufacturing and design tolerances associated with components and the overall system.

Recall from above that the scanner 902 in a high angle of incidence system creates a scan cone 952 that is asymmetrically oriented about the principal beam 1053. Additionally, in the illustrative embodiment of FIG. 9, the scanner 902 is oriented in a non-orthogonal relationship with the microlens array 910. Accordingly, the varied thickness optical element 900 is configured to do two things: First, it steers the received scan cone 952 such that the principal beam 953 enters the microlens array 910 at an angle that is substantially orthogonal with the first layer 912 and the second layer 924. Second, it steers the remaining beams such that the received scan cone 952 exits the varied thickness optical element substantially symmetrically about the principal beam 953. This is shown illustratively in FIG. 9 with a first half 985 of the output cone 928 having substantially the same area as a second half 986 of the output cone 928.

In one embodiment, the varied thickness optical element 900 is configured to perform a third task. In certain head-up display, near-to-eye display, and other optical systems, downstream components such as relay optics look to receive beams having a predetermined amount of spread. In one embodiment, the relay optics are configured to perform more optimally when the received light has a predetermined spread associated therewith. For example, in some systems, relay optics are configured to perform better when the output cone 928 is an output expansion cone having a predetermined spread of between ten and fifteen degrees. Accordingly, in one embodiment the varied thickness optical element 900 is further configured to cause beams 922,923 of the received scan cone 952 to exit the varied thickness optical element 1000 with a predetermined spread relative to the principal beam 953.

In the illustrative embodiment of FIG. 9, the microlens elements are arranged in accordance with the predetermined spread. For example, microlens element 920 and microlens element 921 are arranged with a pitch that corresponds to the predetermined spread. (Note that the lens elements through which the principal beam 953 passes have no pitch associated therewith. However, in one embodiment all other lens elements are arranged with pitch.)

The exit pupil expander 904 of FIG. 9 is well suited for use in head-up and near-to-eye displays. As noted above, relay optics are simplified when the received scan cone is substantially symmetrical about the principal beam. Further, as described in the preceding paragraph, head-up optics often perform better when the received scan cone includes a predetermined amount of spread. By varying the thickness of the varied thickness optical element across the width of the element, i.e., by varying the thickness of the wedge in this embodiment, a designer can optimize the varied thickness optical element for a particular system geometry and a particular amount of keystone distortion introduced by the high angle of incidence scanning engine. Thus, in a scanned laser projection system employing the exit pupil expander 904 of FIG. 9, the varied thickness optical element 900 not only effectively eliminates keystone distortion, but also prepares the output expansion cone 928 to optimize the performance of subsequent optical components in a system.

The exit pupil expander 904 of FIG. 9 can be manufactured from a variety of materials. Additionally, the numerical aperture expander 905 can be manufactured from a variety of materials. Illustrative materials include glass and plastic. In one embodiment, the numerical aperture expander 905 and varied thickness optical element 900 are manufactured from the same material. In another embodiment, they are manufactured from different materials. The varied thickness optical element 900 can be attached to the numerical aperture expander 1005, or alternatively may be integrated into one of the first layer 912 or second layer 924. For example, where both the varied thickness optical element 900 and numerical aperture expander 905 are both manufactured from glass, they can be attached to each other using conventional glass bonding techniques or by using an optical adhesive.

In one embodiment, to simplify manufacture and reduce cost, the varied thickness optical element 900 is integrated with one of the first layer 912 or second layer 924 of the numerical aperture expander 905. For instance, a portion of the microlens array 910, the second layer 924, and the varied thickness optical element can be manufactured as an integrated plastic assembly by way of an injection molding process. This assembly can then be aligned with the remaining portion of the microlens array 910 and first layer 912 to complete the assembly. Another advantage of using plastic and injection molding for the components is that it is easier to achieve the necessary tolerances used to define the function of the varied thickness optical element 900.

Figure 10:
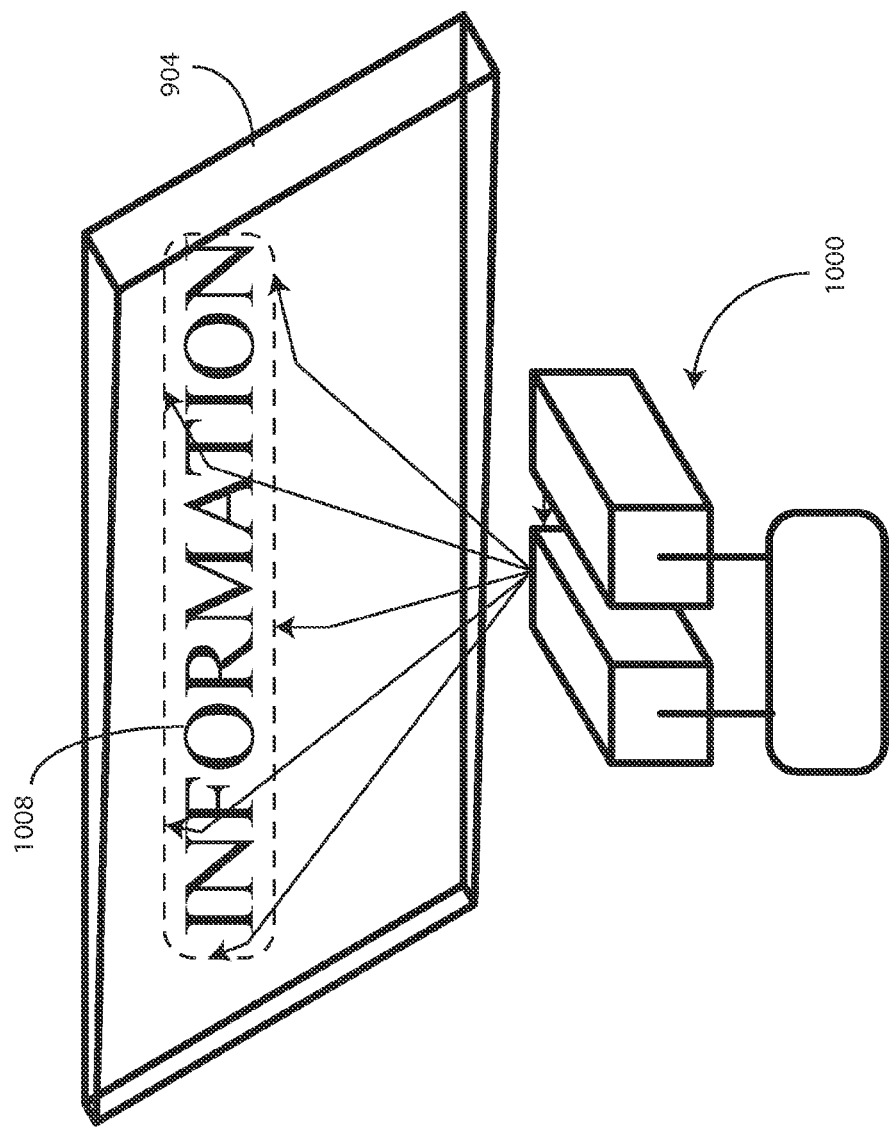
FIG. 10 illustrates an optical redirection device configured in accordance with embodiments of the invention in use with a high angle of incidence projection system.

By placing the varied thickness optical element 900 adjacent to the microlens array 910, the varied thickness optical element 900 is disposed essentially at the intermediate image plane of the overall system shown in FIG. 9. Thus, when the scan cone 952 is presenting pixilated information along the projection surface, the effect applied by the varied thickness optical element 900 is applied "spot by spot." This is another advantage of the exit pupil expander 904 of FIG. 9 over projector level keystone distortion correction where correction is applied while each beam is going in a different direction and traversing a large portion of the correction device. The result of using the exit pupil expander 904 of FIG. 9 is shown in FIG. 10, where information 1008 delivered from a high angle of incidence scanning engine 1000 no longer suffers from keystone distortion. Instead, the information 1008 is clear and legible for delivery to subsequent relay optics.

Figure 11:
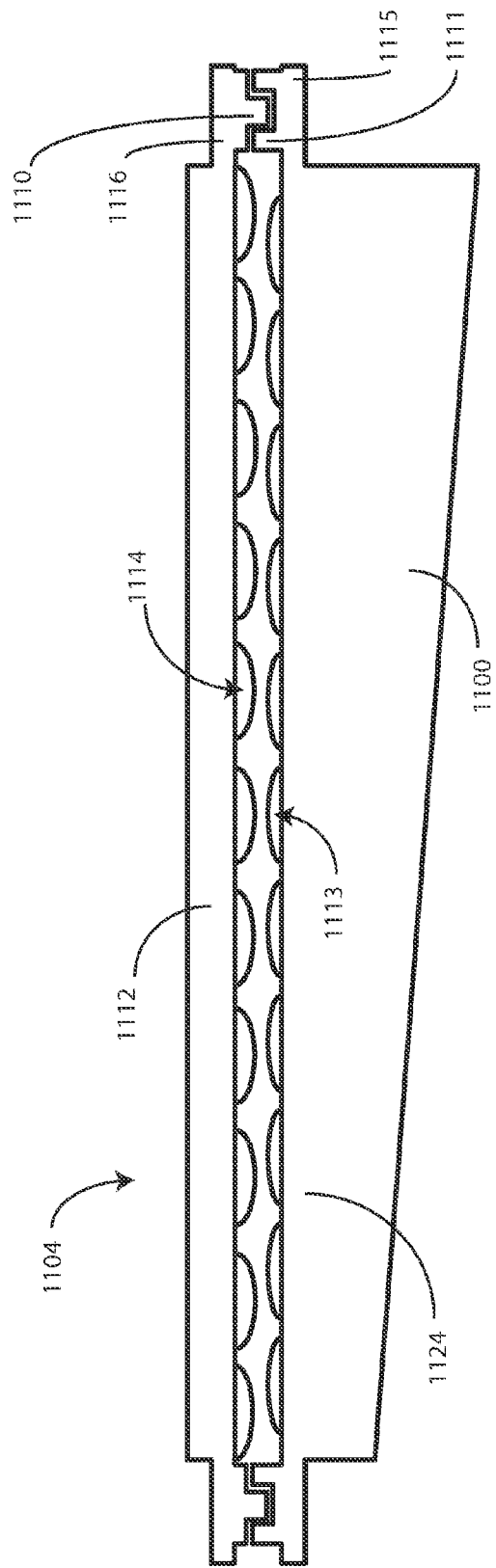
FIG. 11 illustrates another embodiment of an optical redirection device and corresponding microlens array, and an associated alignment method, configured in accordance with one or more embodiments of the invention.
Figure 12:
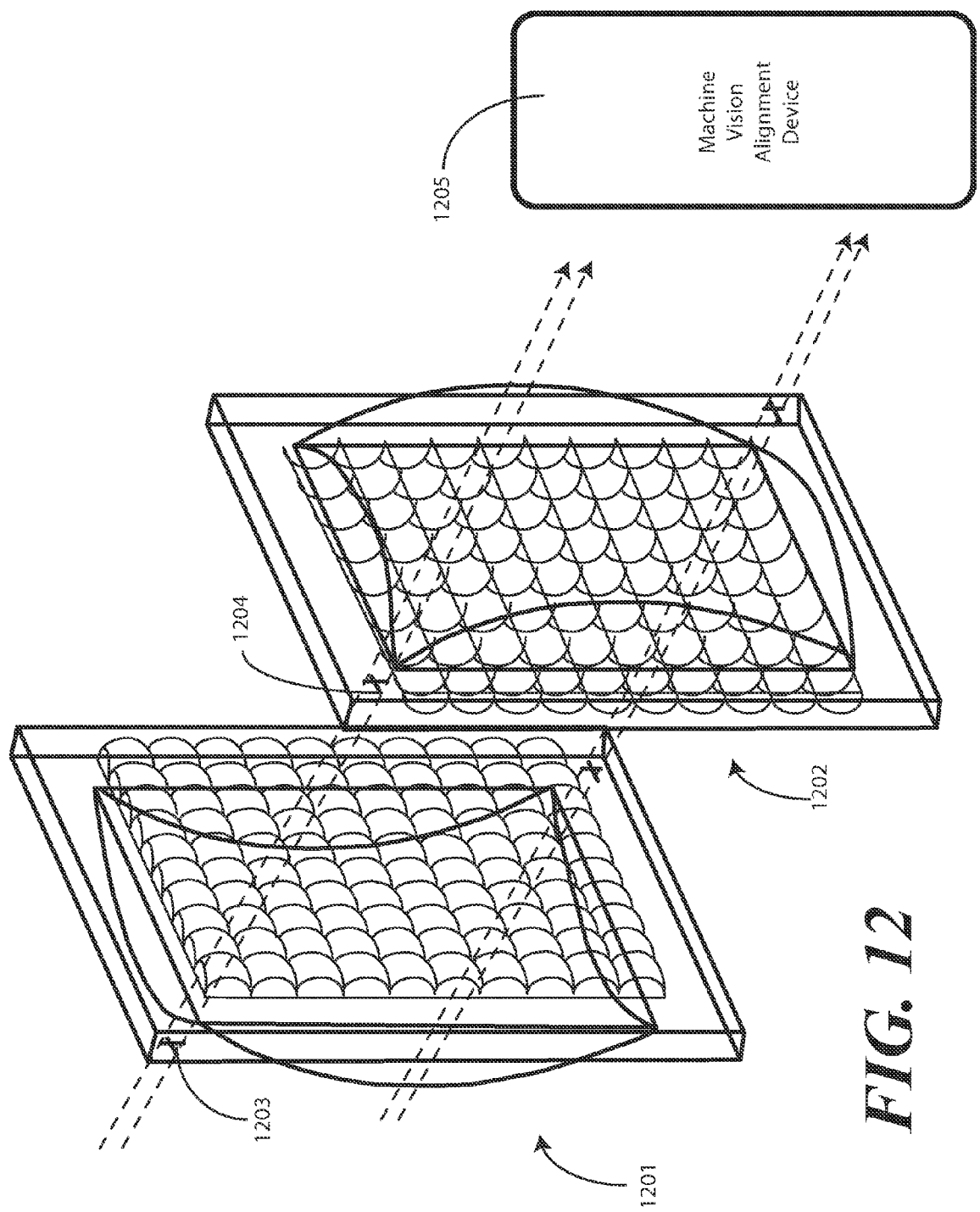
FIG. 12 illustrates another embodiment of an optical redirection device and corresponding microlens array, and an associated alignment method, configured in accordance with one or more embodiments of the invention.

In one embodiment the projection surface (904) of FIG. 9 is manufactured from two halves that must be aligned during assembly. A first half may include half of the microlens array (910) and the first layer (912), while the second half may include the remainder of the microlens array (910), the second layer (924), and the varied thickness optical element (900). To make alignment easier, in one embodiment these halves can be configured with alignment indicators. FIGS. 11 and 12 illustrate two examples of alignment indicators suitable for use with one or more embodiments of the invention.

In FIG. 11, the projection surface 1104 employs mechanical engagement devices 1110,1111 as alignment indicators. The projection surface 1104 of FIG. 11 comprises two halves. A first half includes a first substrate 1112. The first substrate 1112 has a first set 1114 of microlenses either disposed thereon or integrated therewith. The second half includes a second substrate 1124 and the varied thickness optical element 1100, which is integrated with the second substrate 1124 in this illustrative embodiment. A second set 1123 of microlenses is either disposed on or integrated with the second substrate 1124.

To make alignment of the two halves easier during manufacture, the first half includes a first mechanical engagement device 1110, while the second half includes a second mechanical engagement device 1111. In this illustrative embodiment, the first mechanical engagement device 1110 is a male engagement device mounted on a flange 1116 extending from the first substrate 1112. The second mechanical engagement device 1111 is a female engagement device mounted on another flange 1115 extending from the second substrate 1124. The male and female engagement devices can be nestled to make alignment of the first half and second half easier.

Turning to FIG. 12, illustrated therein is an alternate alignment indicator. In FIG. 12, each half 1201,1202 of the projection surface includes an indicator 1203,1204 that is configured to be read by a machine vision alignment device 1205. In the illustrative embodiment of FIG. 12, the indicators 1203, 1204 are configured as small plus or cross marks that are either etched or tooled into each half 1201,1202. During manufacture, the machine vision alignment device 1205 takes visual pictures of the halves 1201,1202 as they are moved relative to each other. When the indicators 1203,1204 coincide, such that the picture seen by the machine vision alignment device 1205 appears as a single indicator, the two halves 1201,1202 are aligned. Accordingly, they can then be bonded together as described above with reference to FIGS. 2 and 3.

Figure 13:
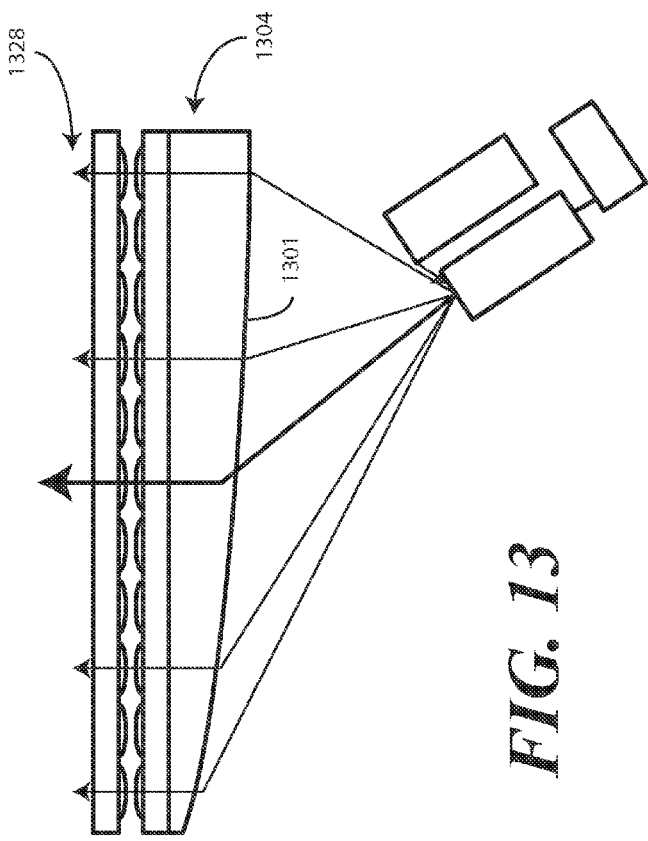
FIG. 13 illustrates another optical redirection device configured in accordance with one or more embodiments of the invention.

To this point, embodiments of the varied thickness optical element have been exclusively shown as wedges. However, it will be clear to those of ordinary skill in the art having the benefit of this disclosure that embodiments of the varied thickness optical element are not so limited. Turning now to FIG. 13, illustrated therein is just one of the many possible variants that can be constructed without departing from the spirit and scope of the invention.

As shown in FIG. 13, the varied thickness optical element 1304 is a varied thickness device, in that its thickness varies across its width. However, the varied thickness optical element 1304 of FIG. 13 is not configured as a wedge. Instead, the varied thickness optical element 1304 has a major face 1301 that is non-linear. In this illustrative embodiment, the major face is shown as a convex surface. However, it will be clear to those of ordinary skill in the art having the benefit of this disclosure that other shapes and contours can be applied to achieve different results in the output cone 1328. For example, one application may call for a telecentric output cone 1328. By varying the contour of the major face 1301 of the varied thickness optical element, this effect—or other effects—can be easily achieved.

Figure 14:
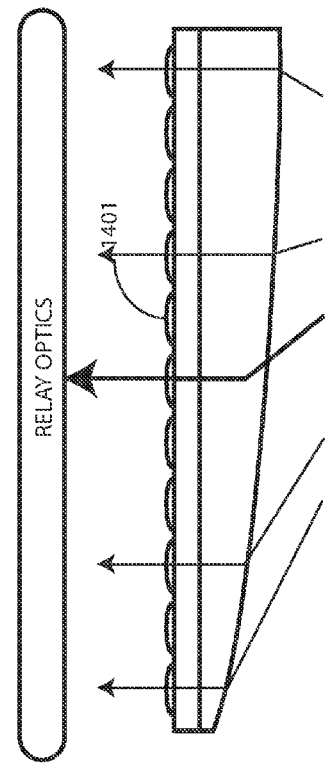
FIG. 14 illustrates a single-sided optical redirection device configured in accordance with one or more embodiments of the invention.

It should also be noted that the "expander" portion of embodiments of the invention need not be complementary. For example, the microlens array (910) of FIG. 9 included two halves. As shown in FIG. 14, the "expander" can be single sided as well. For example, the exit pupil expander surface 1401 can be either an optical diffuser or single sided microlens array, either of which is single sided.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An optical device, comprising:
   an exit pupil expander; and
   a varied thickness optical element coupled to an input of the exit pupil expander, the varied thickness optical element configured to receive a scan cone, and to transform a principal beam of the scan cone prior to entering the exit pupil expander to be substantially orthogonal with an output of the exit pupil expander.

2. The optical device of claim 1, wherein the varied thickness optical element is further configured to cause the received scan cone to exit the varied thickness optical element substantially symmetrically about the principal beam.

3. The optical device of claim 2, wherein the varied thickness optical element comprises an optical wedge.

4. The optical device of claim 2, wherein a major face of the varied thickness optical element is non-linear.

5. The optical device of claim 2, wherein the varied thickness optical element is further configured to cause beams of the received scan cone to exit the varied thickness optical element with a predetermined spread relative to the principal beam.

6. The optical device of claim 1, wherein the exit pupil expander comprises a microlens array.

7. The optical device of claim 6, wherein the microlens array comprises a complementary microlens array, wherein complementary microlens elements of the complementary microlens array are arranged in accordance with a predetermined spread.

8. The optical device of claim 6, wherein the microlens array comprises a first substrate and a second substrate, wherein each of the first substrate and the second substrate comprises an alignment indicator.

9. The optical device of claim 8, wherein the microlens array comprises a complementary microlens array, with a first set of microlenses disposed along the first substrate and a second set of microlenses disposed along the second substrate.

10. The optical device of claim 8, wherein a first alignment indicator of the first substrate comprises a first mechanical engagement device, and a second alignment indicator of the second substrate comprises a second mechanical engagement device.

11. The optical device of claim 8, wherein the alignment indicator is configured to be readable by a machine vision alignment device.

12. The optical device of claim 8, wherein the varied thickness optical element is integrated with one of the first substrate or the second substrate.

13. The optical device of claim 1, wherein the exit pupil expander comprises a diffuser disposed at intermediate image plane of the optical device.

14. A scanned laser projection system, comprising:
    a numerical aperture expander comprising a microlens array;
    a laser scanning engine configured to scan light in a raster sweep pattern to form a scan cone, with a traveling direction of the scan cone being defined by a principal beam; and
    a varied thickness optical element disposed between the laser scanning engine and the numerical aperture expander;
    wherein the varied thickness optical element is configured to redirect the scan cone prior to entering the numerical aperture expander such that the principal beam, when entering the microlens array, is substantially orthogonal with an output of the numerical aperture expander.

15. The scanned laser projection system of claim 14, wherein the varied thickness optical element is further configured to cause the scan cone to enter the numerical aperture expander substantially symmetrically about the principal beam.

16. The scanned laser projection system of claim 14, wherein the varied thickness optical element is further configured to cause the scan cone to enter the numerical aperture expander with substantially a predetermined amount of spread.

17. The scanned laser projection system of claim 14, wherein the varied thickness optical element is one of disposed adjacent to or integrated with the numerical aperture expander.

18. The scanned laser projection system of claim 14, wherein the numerical aperture expander comprises a first substrate having at least one alignment device and a second substrate having at least another alignment device, wherein the first substrate and the second substrate are by the at least one alignment device and the at least another alignment device.

19. The scanned laser projection system of claim 14, wherein the laser scanning engine comprises MEMS scanning engine fed at an angle of incidence greater than a design threshold.

20. The scanned laser projection system of claim 14, wherein the scanned laser projection system comprises one of a near-to-eye or head-up display.

* * * * *